（12) United States Patent
Inoue

(10) Patent No.: US 11,630,988 B2
(45) Date of Patent: Apr. 18, 2023

(54) MULTI-SAMPLE DROPOUT FOR FASTER DEEP NEURAL NETWORK TRAINING

(71) Applicant: International Business Machines Corporation, Armonk, NY (US)

(72) Inventor: Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 16/686,565

(22) Filed: Nov. 18, 2019

(65) Prior Publication Data

US 2021/0150331 A1    May 20, 2021

(51) Int. Cl.
*G06N 3/04*    (2006.01)
*G06N 3/08*    (2006.01)
*G06N 3/082*   (2023.01)

(52) U.S. Cl.
CPC ............. *G06N 3/0454* (2013.01); *G06N 3/04* (2013.01); *G06N 3/082* (2013.01)

(58) Field of Classification Search
CPC ........ G06N 3/0454; G06N 3/04; G06N 3/082; G06N 3/08
See application file for complete search history.

(56) References Cited

U.S. PATENT DOCUMENTS

| 2016/0307098 | A1  | 10/2016 | Goel |   |
|---|---|---|---|---|
| 2020/0082165 | A1* | 3/2020  | Wang | G06V 10/764 |
| 2020/0125953 | A1* | 4/2020  | Yoo  | G06N 7/005 |

FOREIGN PATENT DOCUMENTS

| CN | 109446461 A   | 3/2019 |
|---|---|---|
| WO | 2018085730 A1 | 5/2018 |

OTHER PUBLICATIONS

Chawla, et al., "SMOTE: Synthetic Minority Over-sampling Technique", Journal of Artificial Intelligence Research 16 (2002), pp. 321-357.
Cubuk, et al., "AutoAugment: Learning Augmentation Policies from Data", arXiv:1805.09501v1 [cs.CV] May 24, 2018, pp. 1-14.
Devries, et al., "Improved Regularization of Convolutional Neural Networks with Cutout", arXiv:1708.04552v2 [cs.CV] Nov. 29, 2017, 8 pages.
Gastaldi, Xavier, "Shake-Shake regularization", arXiv:1705.07485v2 [cs.LG] May 23, 2017, 10 pages.
Ghiasi, et al., "DropBlock: A regularization method for convolutional networks", 32nd Conference on Neural Information Processing Systems (NeurIPS 2018), 11 pages.

(Continued)

*Primary Examiner* — Jianxun Yang
(74) *Attorney, Agent, or Firm* — Edward P. Li

(57) ABSTRACT

A computer-implemented method, a computer program product, and a computer system for multi-sample dropout in deep neural network training. A computer creates multiple dropout samples in a minibatch, starting from a dropout layer and ending at a loss function layer in a deep neural network. At the dropout layer in the deep neural network, the computer applies multiple random masks for respective ones of the multiple dropout samples. At a fully connected layer in the deep neural network, the computer applies a shared parameter for all of the multiple dropout samples. After the loss function layer in the deep neural network, the computer calculates a final loss value, by averaging loss values of the respective ones of the multiple dropout samples.

15 Claims, 16 Drawing Sheets

(56) References Cited

OTHER PUBLICATIONS

Hinton, et al., "Improving neural networks by preventing co-adaptation of feature detectors", arXiv:1207.0580v1 [cs.NE] Jul. 3, 2012, 18 pages, <https://arxiv.org/abs/1207.0580>.
Huang, et al., "Deep Networks with Stochastic Depth", arXiv:1603.09382v3 [cs.LG] Jul. 28, 2016, 16 pages.
Inoue, Hiroshi, "Data Augmentation by Pairing Samples for Images Classification", arXiv:1801.02929v2 [cs.LG] Apr. 11, 2018, 8 pages.
Inoue, Hiroshi, "Multi-Sample Dropout for Accelerated Training and Better Generalization", arXiv:1905.09788v2 [cs.NE] May 28, 2019, 12 pages, Evidence of Grace Period Use or Sale, <https://arxiv.org/abs/1905.09788>.
Ioffe, et al., "Batch Normalization: Accelerating Deep Network Training by Reducing Internal Covariate Shift", arXiv:1502.03167v3 [cs.LG] Mar. 2, 2015, 11 pages, <https://arxiv.org/abs/1502.03167v3>.
Kingma, et al., "Adam: A Method for Stochastic Optimization", arXiv:1412.6980v1 [cs.LG] Dec. 22, 2014, 9 pages.
Krizhevsky, et al., "ImageNet Classification with Deep Convolutional Neural Networks", In Annual Conference on Neural Information Processing Systems (NIPS), 2012, 9 pages.
Krogh, et al., "A Simple Weight Decay Can Improve Generalization", In Annual Conference on Neural Information Processing Systems (NIPS), 1991, pp. 950-957.
Larsson, et al., "Fractalnet: Ultra-Deep Neural Networks Without Residuals", arXiv:1605.07648v4 [cs.CV] May 26, 2017, 11 pages.
Mell et al., "The NIST Definition of Cloud Computing", National Institute of Standards and Technology, Special Publication 800-145, Sep. 2011, 7 pages.
Simonyan, et al., "Very Deep Convolutional Networks for Large-Scale Image Recognition", arXiv:1409.1556v1 [cs.CV] Sep. 4, 2014, 10 pages, <https://arxiv.org/abs/1409.1556v1>.
Srivastava, et al., "Dropout: A Simple Way to Prevent Neural Networks from Overfitting", Journal of Machine Learning Research 15 (2014), pp. 1929-1958, <http://jmlr.org/papers/volume15/srivastava14a.old/srivastava14a.pdf>.
Szegedy, et al., "Going deeper with convolutions", arXiv:1409.4842v1 [cs.CV] Sep. 17, 2014, 12 pages.
Szegedy, et al., "Rethinking the Inception Architecture for Computer Vision", arXiv:1512.00567v3 [cs.CV] Dec. 11, 2015, 10 pages.
Tokui, et al., "Chainer: a Next-Generation Open Source Framework for Deep Learning", Workshop on Machine Learning Systems at Neural Information Processing Systems (NIPS), Dec. 12, 2015, 6 pages.
Tompson, et al., "Efficient Object Localization Using Convolutional Networks", arXiv:1411.4280v1 [cs.CV] Nov. 16, 2014, 9 pages.
Wan, et al., "Regularization of Neural Networks using DropConnect", Proceedings of the 30 th International Conference on Machine Learning, Atlanta, Georgia, USA, 2013, 12 pages.
Zhang, et al., "mixup: Beyond Empirical Risk Minimization", arXiv:1710.09412v1 [cs.LG] Oct. 25, 2017, 11 pages.

\* cited by examiner

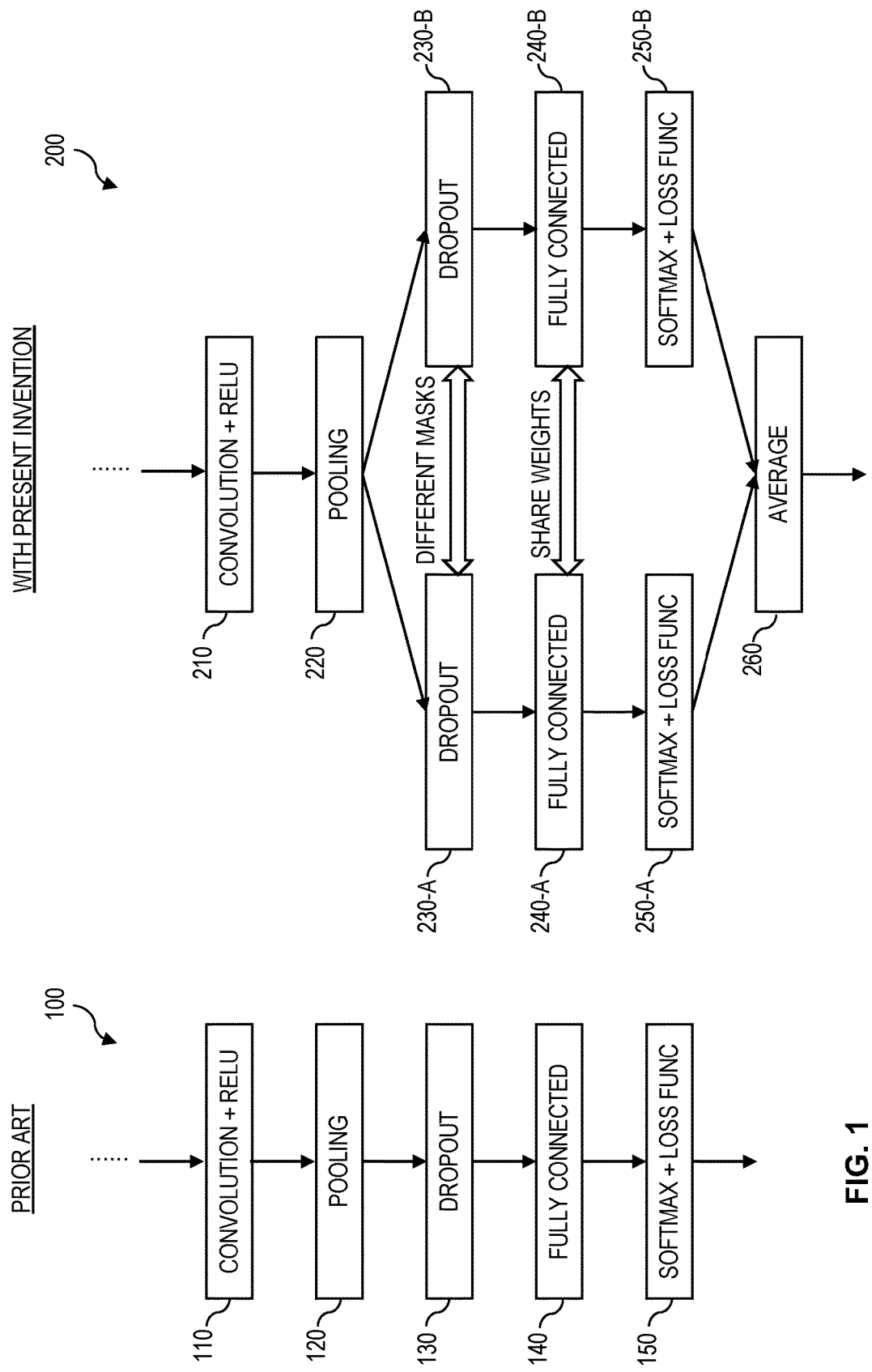

MULTI-SAMPLE DROPOUT FOR FASTER DEEP NEURAL NETWORK TRAINING

The following disclosure is submitted under 35 U.S.C. 102(b)(1)(A): DISCLOSURE: "Multi-Sample Dropout for Accelerated Training and Better Generalization", arXiv: 1905.09788v2 [cs.NE] 28 May 2019, 12 pages.

BACKGROUND

The present invention relates generally to deep neural networks, and more particularly to multi-sample dropout for faster deep neural network training.

While dropout is one of key regularization techniques for improving the generalization of deep neural networks (DNNs), a wide variety of other regularization techniques have been reported. These techniques include, for example, weight decay, data augmentation, label smoothing, and batch normalization. Although batch normalization is aimed at accelerating training, it also improves generalization. Many of these techniques are network independent while others are specialized for a specific network architecture.

Because of simplicity and efficiency dropout, the original dropout and various similar techniques are widely used in today's neural networks. The use of dropout prevents the trained neural networks from overfitting to the training data by randomly discarding (i.e., dropping) 50% of neurons at each training iteration. As a result, the neurons cannot depend on each other, and hence the trained network achieves better generalization. During inference, neurons are not discarded, so that all information is preserved; instead, each outgoing value is multiplied by 0.5 to make the average value consistent with the training time. The neural network used for inference can be viewed as an ensemble of many sub-networks randomly created during training. The success of dropout has inspired the development of many techniques using various ways for selecting information to discard. The techniques use a variety of ways to randomly drop information in the network. For example, one technique discards a portion of the connections between neurons randomly selected during training instead of randomly discarding neuron; another technique randomly discards areas in convolution layers while dropout is typically used in fully connected layers after the convolution layers; yet another technique randomly skip layers in a very deep network.

Several neural network architectures have multiple exits with loss functions. For example, one neural network architecture has two early exits in addition to the main exit, and the final prediction is made using a weighted average of outputs from these three loss functions; the neural network architecture creates the two additional exits at earlier positions in the network.

SUMMARY

In one aspect, a computer-implemented method for multi-sample dropout in deep neural network training is provided. The computer-implemented method comprises creating multiple dropout samples in a minibatch, starting from a dropout layer and ending at a loss function layer in a deep neural network. The computer-implemented method further comprises applying multiple random masks at the dropout layer for respective ones of the multiple dropout samples. The computer-implemented method further comprises applying a shared parameter at a fully connected layer for all of the multiple dropout samples. The computer-implemented method further comprises calculating, after the loss function layer, a final loss value, by averaging loss values of the respective ones of the multiple dropout samples.

In another aspect, a computer program product for multi-sample dropout in deep neural network training is provided. The computer program product comprising one or more computer-readable tangible storage devices and program instructions stored on at least one of the one or more computer-readable tangible storage devices. The program instructions are executable to create, starting from a dropout layer and ending at a loss function layer, multiple dropout samples in a minibatch. The program instructions are further executable to apply, at the dropout layer, multiple random masks for respective ones of the multiple dropout samples. The program instructions are further executable to apply, at a fully connected layer, a shared parameter for all of the multiple dropout samples. The program instructions are further executable to calculate, after the loss function layer, a final loss value, by averaging loss values of the respective ones of the multiple dropout samples.

In yet another aspect, a computer system for multi-sample dropout in deep neural network training is provided. The computer system comprises one or more processors, one or more computer readable tangible storage devices, and program instructions stored on at least one of the one or more computer readable tangible storage devices for execution by at least one of the one or more processors. The program instructions are executable to: create, starting from a dropout layer and ending at a loss function layer, multiple dropout samples in a minibatch; apply, at the dropout layer, multiple random masks for respective ones of the multiple dropout samples; apply, at a fully connected layer, a shared parameter for all of the multiple dropout samples; and calculate, after the loss function layer, a final loss value, by averaging loss values of the respective ones of the multiple dropout samples.

BRIEF DESCRIPTION OF THE SEVERAL VIEWS OF THE DRAWINGS

FIG. 1 is a diagram illustrating a technique of original dropout widely used in neural networks.

FIG. 2 is a diagram illustrating multi-sample dropout for faster deep neural network training, in accordance with one embodiment of the present invention.

DETAILED DESCRIPTION

Figure 3A:
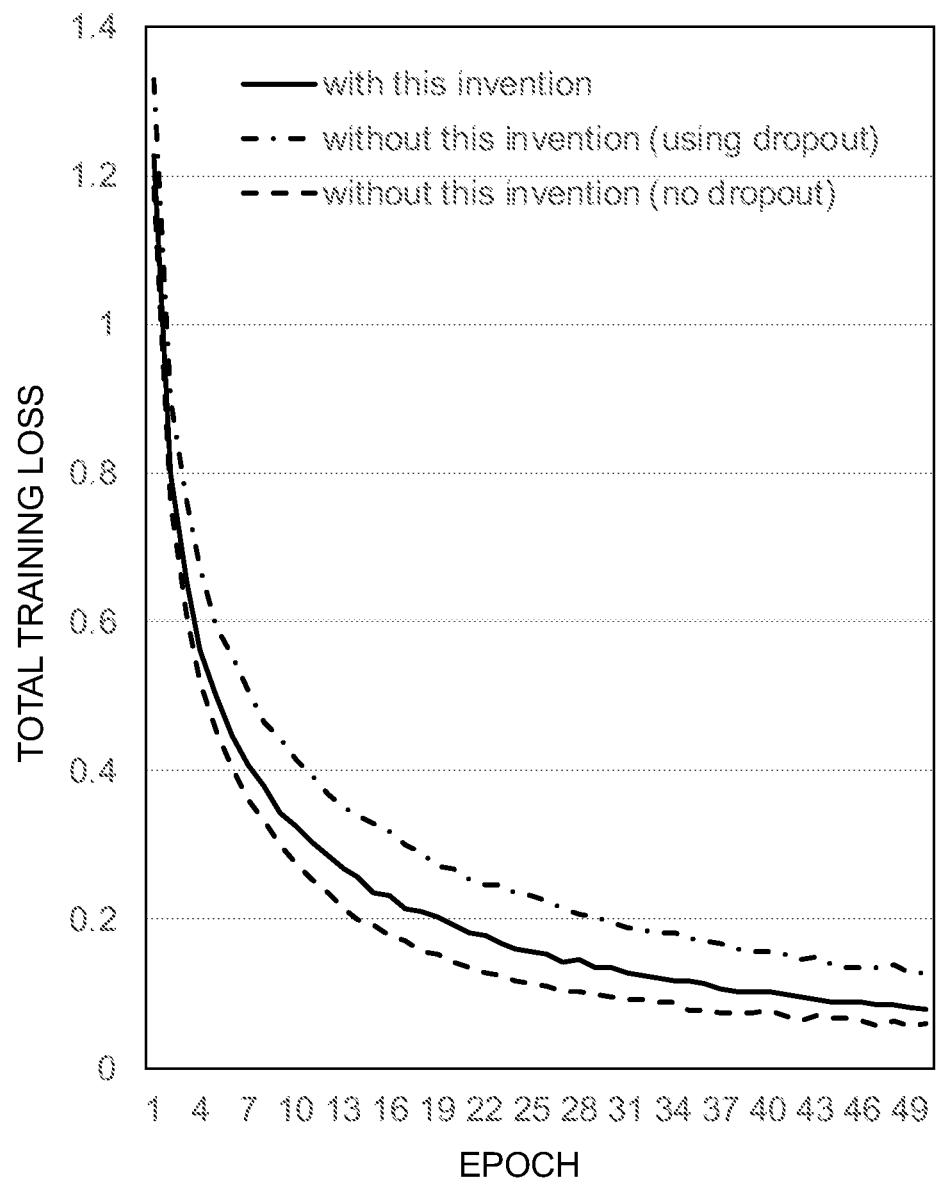
FIG. 3(A), FIG. 3(B), and FIG. 3(C) present performance of multi-sample dropout using the CIFAR-10 dataset, in accordance with one embodiment of the present invention.

Embodiments of the present invention disclose a technique of multi-sample dropout, a dropout technique extended in a different way. Contrary to the original dropout which creates a randomly selected subset (a dropout sample) from the input during training, the proposed multi-sample dropout creates multiple dropout samples. The losses are calculated for respective ones of the multiple dropout samples, and then the losses are averaged to obtain the final loss. By calculating losses for M dropout samples and ensembling them, neural network parameters are updated to achieve smaller loss with any of M dropout samples. This is similar to performing M training repetitions for each input image in a same minibatch. Therefore, the technique of multi-sample dropout significantly reduces the number of iterations needed for deep neural network training. It is observed in experiments that the technique of multi-sample dropout also improved neural network accuracy. Experiments demonstrated that the technique of multi-sample dropout achieves smaller losses and errors for both the training set and validation set on image classification tasks.

No other dropout technique uses a similar approach as the technique of multi-sample dropout to accelerate the deep neural network training. FIG. 1 is diagram 100 illustrating a technique of original dropout widely used in neural networks. A convolutional neural network (CNN), which is shown in FIG. 1, includes convolution+ReLU layer 110, pooling layer 120, dropout layer 130, fully connected layer 140, and softmax+loss function layer 150. Convolution+ReLU layer 110 and pooling layer 120 require larger computation power; however, dropout layer 130, fully connected layer 140, and softmax+loss function layer 150 require small computation power. In the technique of original dropout, such as convolutional neural network, dropout is typically applied to layers near the end of the neural network. For example, VGG16, a convolutional neural network model, uses dropout for 2 fully connected layers following 13 convolution layers.

Multi-sample dropout can be easily implemented on deep learning frameworks without adding a new operator by duplicating a part of the neural network after the dropout layer while sharing the weights among the fully connected layers duplicated for each dropout sample.

Compared to the original dropout, the technique of multi-sample dropout is a new regularization technique for accelerating the training of deep neural networks. Evaluations of the technique on image classification tasks were conducted by using the ImageNet, CIFAR-10, CIFAR-100, and Street View House Numbers (SVHN) datasets; the evaluations demonstrated that the technique of multi-sample dropout increases accuracy for both the training and validation datasets as well as accelerating the deep neural network training. The technique of multi-sample dropout is also applicable to other regularization techniques based on random omission, such as DropConnect.

FIG. 2 is diagram 200 illustrating multi-sample dropout for faster deep neural network training, in accordance with one embodiment of the present invention. The basic idea of the technique of multi-sample dropout is to create multiple dropout samples instead of only one. In the technique of multi-sample dropout, multiple dropout samples are created in a minibatch, starting from the dropout layer and ending at the loss function layer. In the dropout layer, different random masks are used for the respective ones of the multiple dropout samples, such that different subsets of neurons are discarded from the respective ones the multiple dropout samples. However, in the fully connected layer, a shared parameter is applied to all of the multiple dropout samples. After the loss function layer, a final loss value is calculated, by averaging loss values of the respective ones of the multiple dropout samples.

As an example of implementing multi-sample dropout, FIG. 2 depicts an implement two sample dropout using an existing deep learning framework with only common operators. In the example shown in FIG. 2, two dropout samples are created in a minibatch. Although a configuration with two dropout samples is shown in FIG. 2, multi-sample dropout can be configured to use any number of dropout samples.

The technique of multi-sample dropout shown in FIG. 2 includes convolution+ReLU layer 210 and pooling layer 220, which are similar to the technique of original dropout shown in FIG. 1. By comparing the dropout layer and several layers after the dropout layer shown in FIG. 1 and FIG. 2, the differences of between the original dropout and the multiple-sample dropout can be identified. As shown in FIG. 2, in the technique of multiple-sample dropout, the dropout layer and the several layers after the dropout layer are duplicated for each dropout sample; the dropout layer is duplicated as dropout layer 230-A and dropout layer 230-B, the fully connected layer is duplicated as fully connected layer 240-A and fully connected layer 240-B, and the softmax+loss function layer is duplicated as softmax+loss function layer 250-A and softmax+loss function layer 250-B.

Different random masks are used for the dropout sample in dropout layer 230-A and the dropout sample in dropout layer 230-B, so that different subsets of neurons are used for respective ones of dropout layer 230-A and dropout layer 230-B. However, parameters (i.e., connection weights) are shared between fully connected layer 240-A and fully connected layer 240-B.

In softmax+loss function layer 250-A and softmax+loss function layer 250-B, the loss is computed for each of the dropout sample, using the same loss function, e.g., cross entropy. As shown by block 260, a final loss value is obtained by averaging respective loss values computed in softmax+loss function layer 250-A and softmax+loss function layer 250-B. The final loss value is used as the objective function for optimization during deep neural network training. A class label with the highest value in an average of outputs from the last fully connected layer is taken as a prediction.

When dropout is applied to a layer near the end of the network, the additional execution time due to the duplicated operations is not significant. Because the execution time for the fully connected layers is much shorter than that for the convolution layers, duplicating the fully connected layers does not significantly increase the total execution time per iteration. Experiments using the ImageNet, CIFAR-10, CIFAR-100, and Street View House Numbers (SVHN) datasets showed that, with an increasing number of dropout samples created at each iteration, the improvements obtained (reduced number of iterations needed for training and higher accuracy) became more significant at the expense of a longer execution time per iteration and greater memory consumption with up to 64 dropout samples. Consideration of the reduced number of iterations along with the increased time per iteration revealed that the total training time was the shortest with a moderate number of multiple dropout samples, such as 8 or 16.

Neurons are not discarded during inference, as is done in the original dropout. The loss is calculated for only one dropout sample because the dropout samples become identical at the inference time, enabling the network to be pruned to eliminate redundant computations. Note that, using all the dropout samples at the inference time does not badly affect the prediction performance, it just slightly increases the inference-time computation costs.

An effect of multi-sample dropout with M dropout samples is similar to that of enlarging the size of a minibatch M times by duplicating each sample in the minibatch M times. For example, if a minibatch consists of two data samples <A, B>, training a network by using multi-sample dropout with two dropout samples closely corresponds to training a network by using the original dropout and a minibatch of <A, A, B, B>. Here, dropout is assumed to apply a different mask to each sample in the minibatch. Multi-sample dropout can enjoy similar gains without a huge increase in computation cost, because it duplicates only the operations after dropout layers. Because of the non-linearity of the activation functions, the original dropout with a larger minibatch with duplicated samples and multi-sample dropout do not give exactly the same results. However, similar acceleration was observed in the training in terms of the number of iterations, as shown by experimental results.

The key to faster training with multi-sample dropout is the diversity among dropout samples. If there is no diversity, the multi-sample technique gives no gain and simply wastes computation resources. Although dropout is one of the best sources of diversity, the technique of multi-sample dropout can be used with other sources of diversity. For example, regularization techniques that randomly hinder a portion of the information, such as DropConnect, can be enhanced by using the multi-sample technique.

To demonstrate that benefits can be obtained from other sources of diversity, two additional diversity creation techniques are evaluated horizontal flipping and zero padding at the pooling layer. Random horizontal flipping of the input image is a widely used data augmentation technique in many tasks for image datasets. It is applied here immediately before the first fully connected layer; for half of the dropout samples, horizontal flipping is applied deterministically. When pooling an image with a size that is not a multiple of the window size, e.g., when applying 2×2 pooling to a 7×7 image, the zero padding can be added on the left or right and at the top or bottom. In the implementation described here, zero padding is added on the right (and bottom) for half of the dropout samples and on the left (and bottom) for the other half. The location of the zero padding is controlled by using horizontal flipping; i.e., "flip, pool with zero padding on right, and then flip" is equivalent to "pool with zero padding on left".

Experimental results show the effects of using the multi-sample dropout for various image classification tasks using CIFAR-10, CIFAR-100, and ImageNet datasets. For the CIFAR-10, CIFAR-100, and SVHN datasets, an 8-layer network with six convolutional layers and batch normalization followed by two fully connected layers with dropout was used. The network executed dropout twice with dropout ratios of 40% and 30%. For the ImageNet datasets, VGG16 was used as the network architecture, and the network was trained using stochastic gradient descent with momentum as the optimization method with a batch size of 100 samples. VGG16 is a convolutional neural network model proposed by K. Simonyan and A. Zisserman from the University of Oxford in the paper "Very Deep Convolutional Networks for Large-Scale Image Recognition". In the VGG16 architecture, dropout was applied for the first two fully connected layers with 50% as dropout ratio.

For all datasets, data augmentation was used by extracting a patch from a random position of the input image and by performing random horizontal flipping during training. For the validation set, the patch from the center position was extracted and fed into the classifier without horizontal flipping.

Figure 3B:
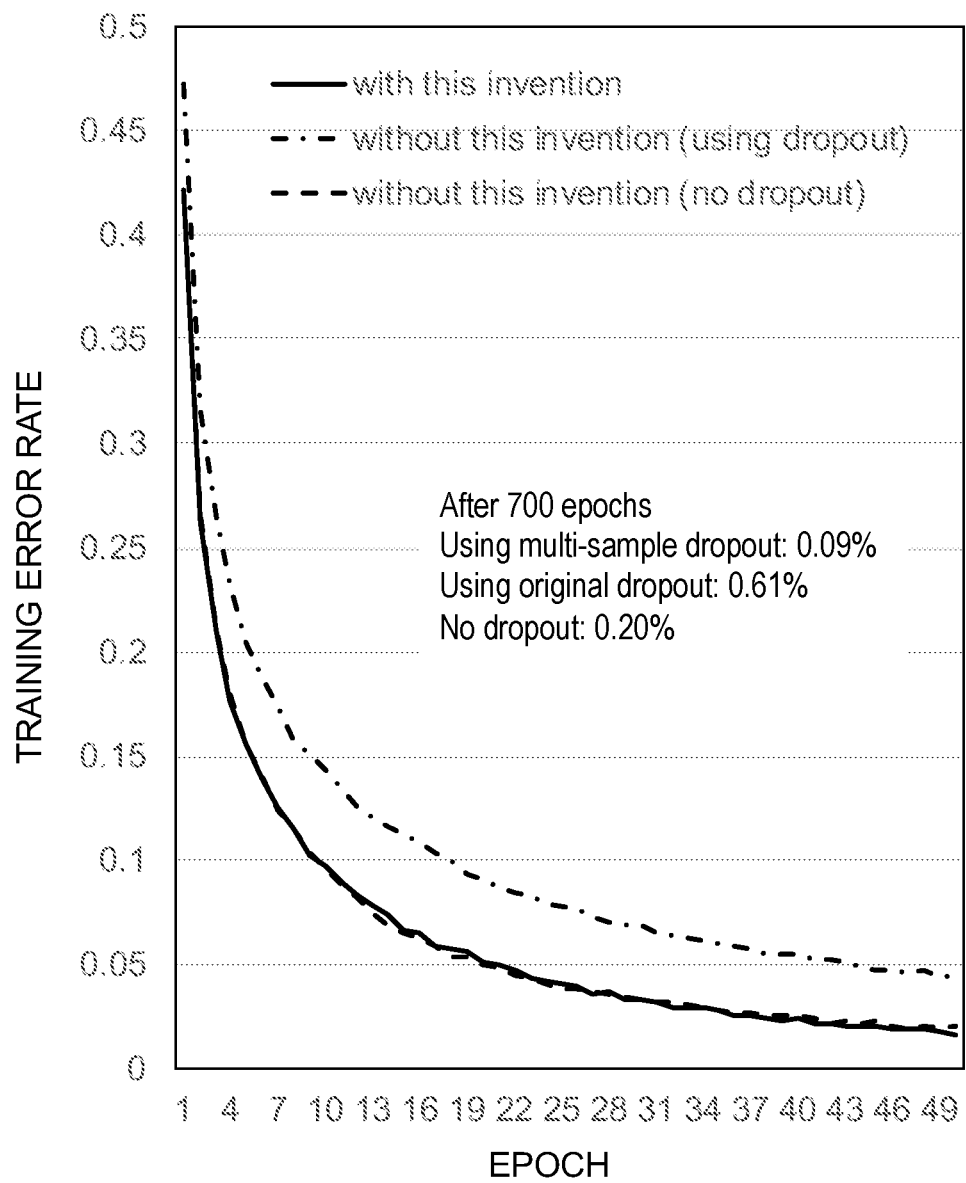
Figure 3C:
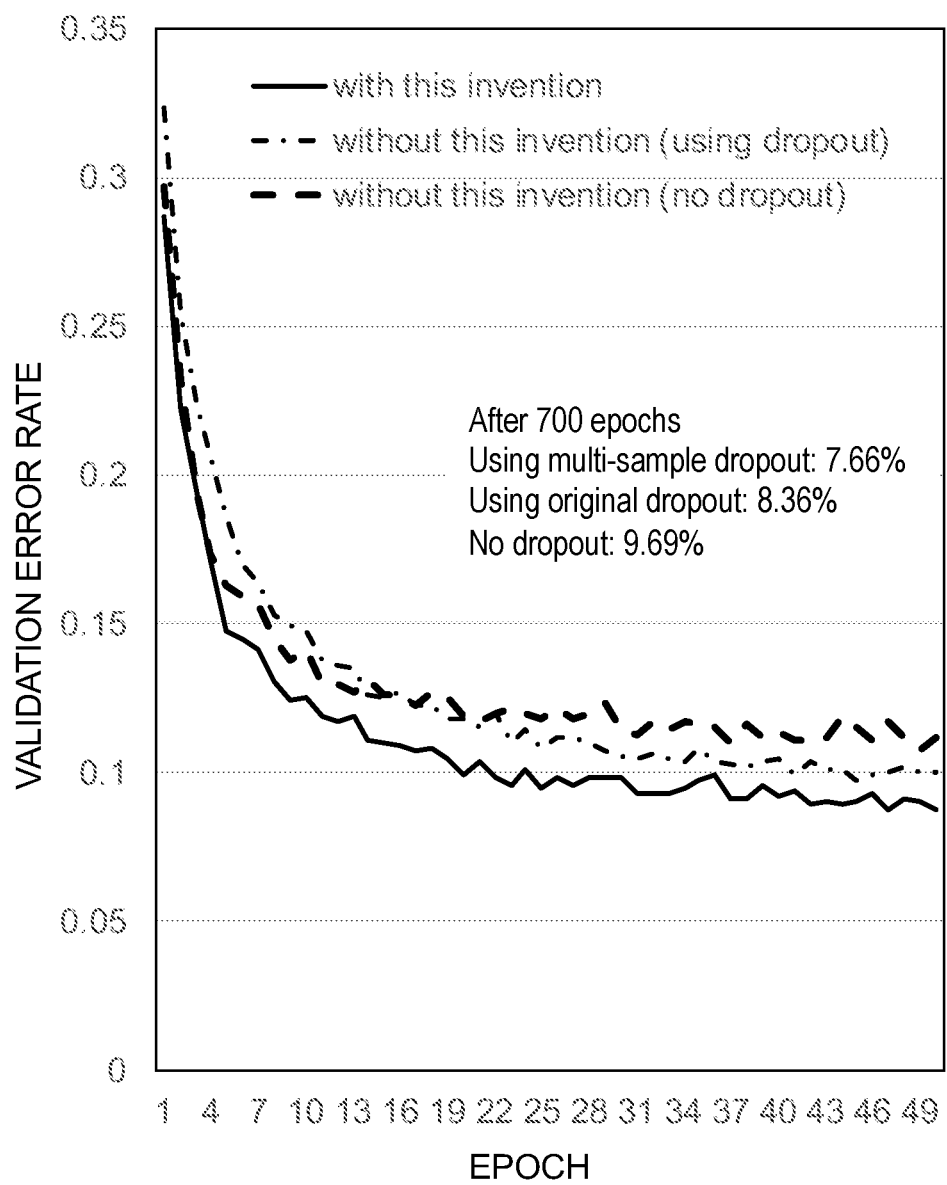
Figure 4A:
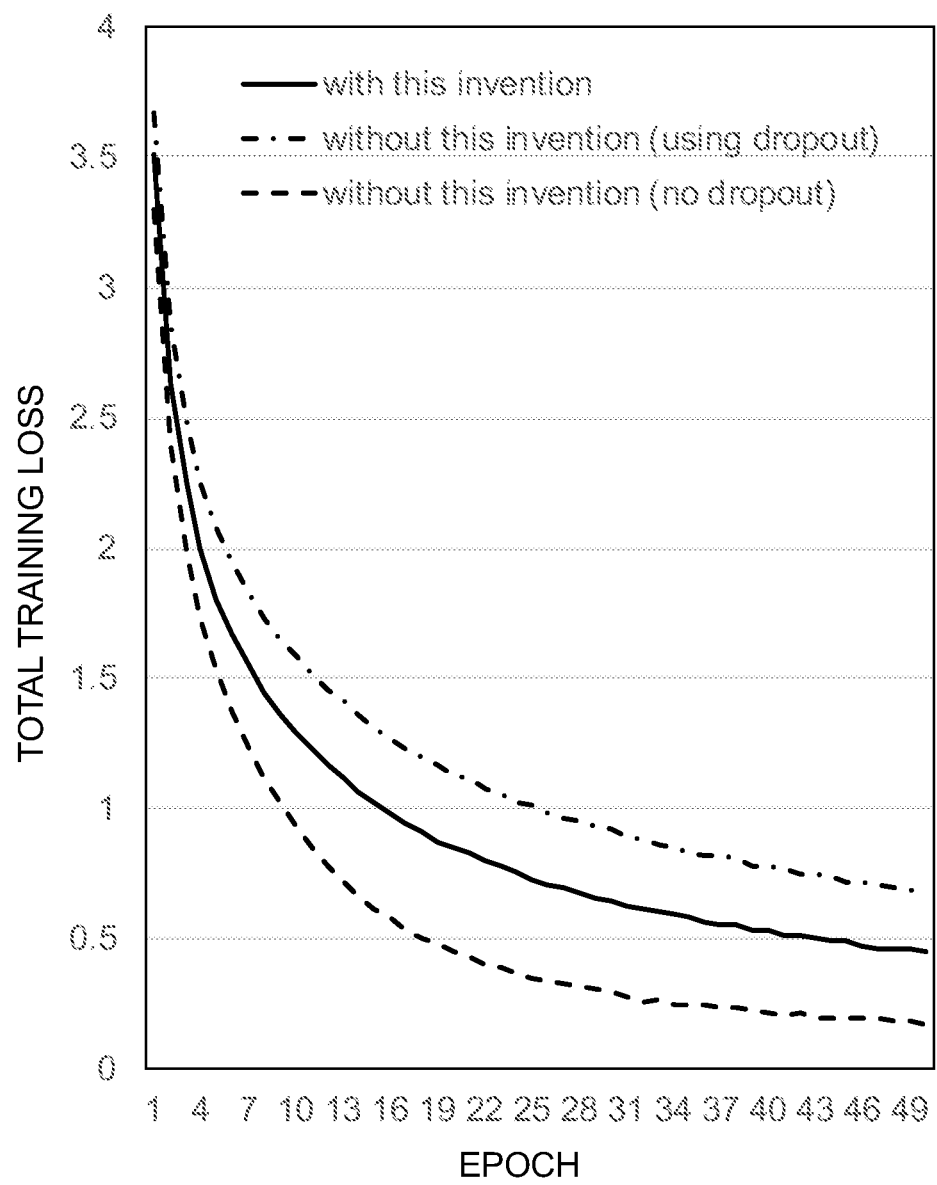
FIG. 4(A), FIG. 4(B), and FIG. 4(C) present performance of multi-sample dropout using the CIFAR-100 dataset, in accordance with one embodiment of the present invention.
Figure 4B:
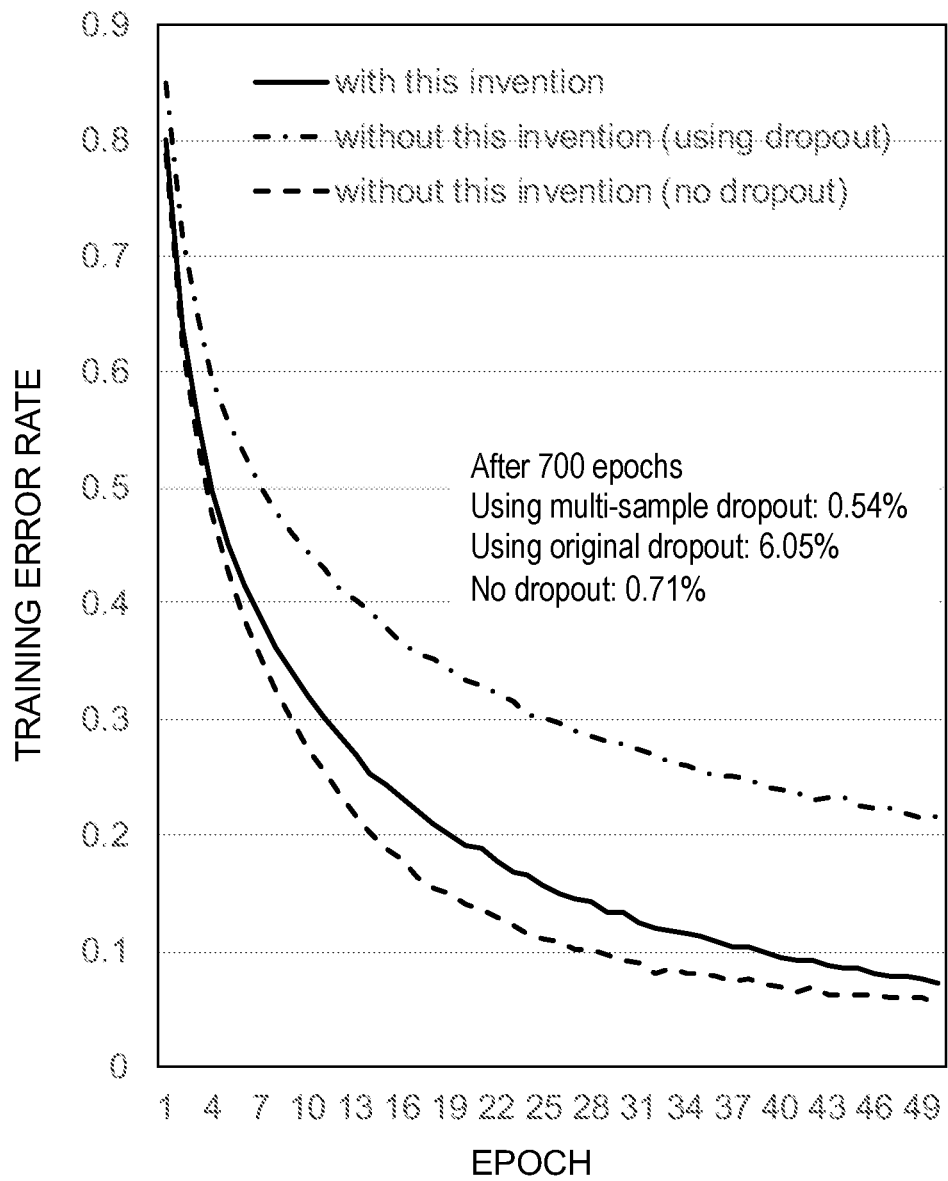
Figure 4C:
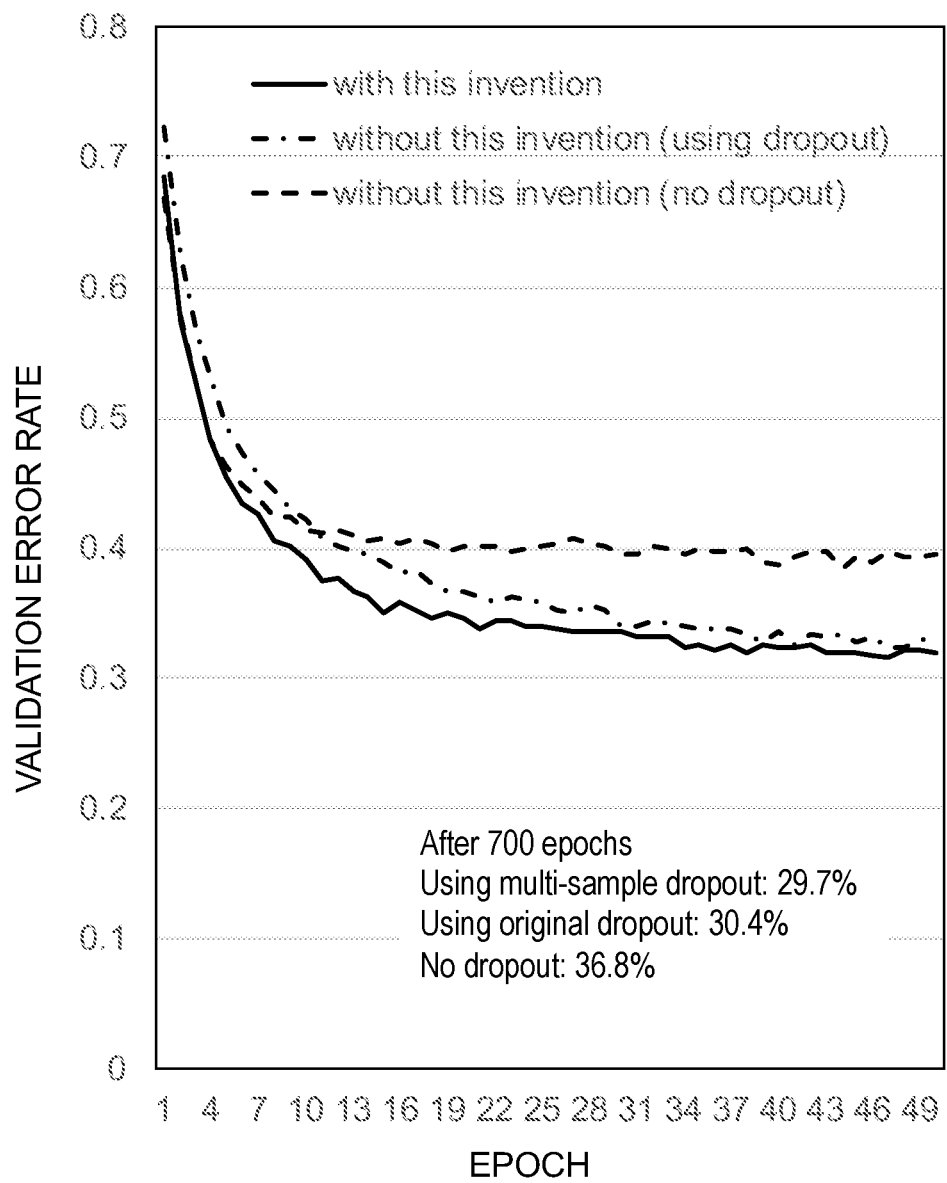
Figure 5A:
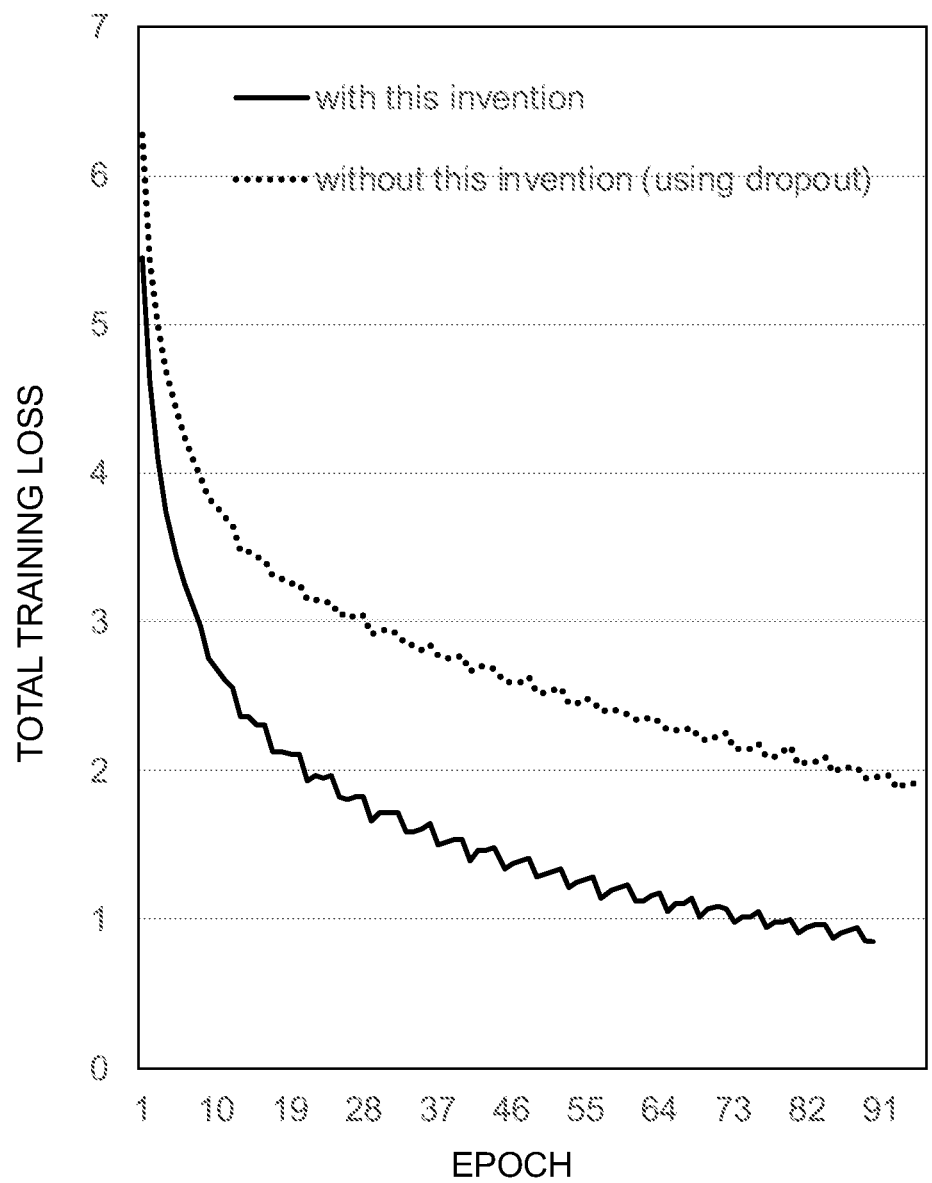
FIG. 5(A), FIG. 5(B), and FIG. 5(C) present performance of multi-sample dropout using the ImageNet dataset, in accordance with one embodiment of the present invention.
Figure 5B:
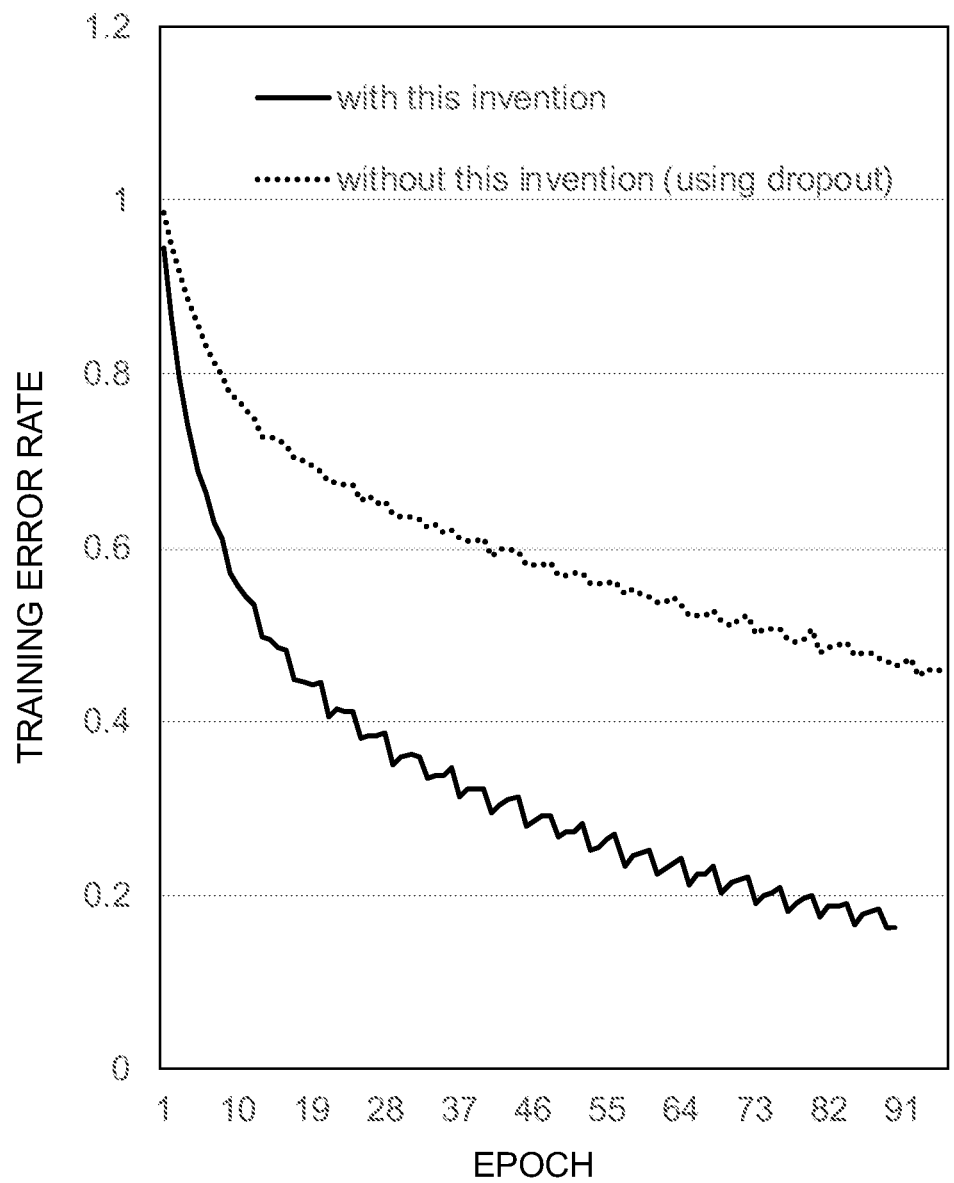
Figure 5C:
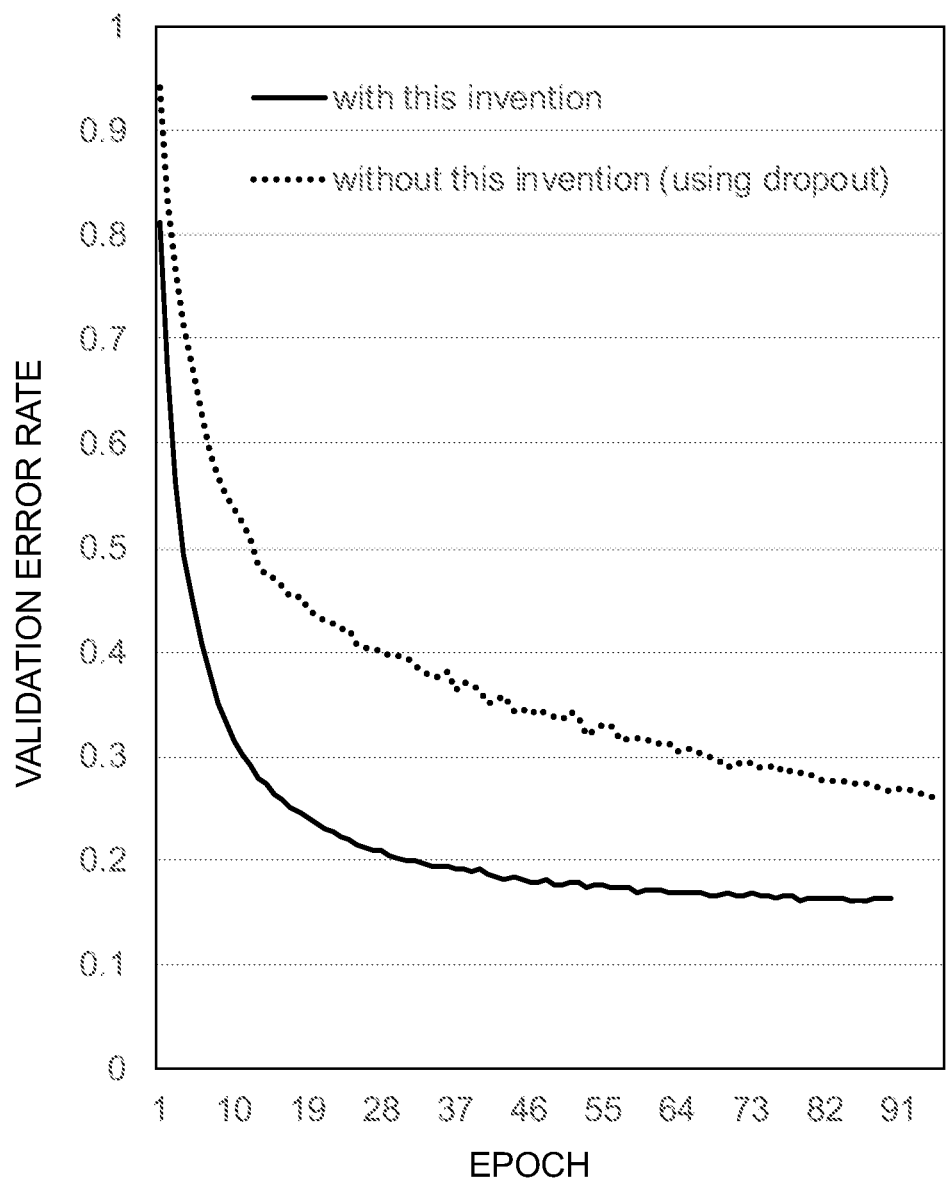

FIG. 3(A), FIG. 3(B), and FIG. 3(C) present performance of multi-sample dropout using the CIFAR-10 dataset, in accordance with one embodiment of the present invention. FIG. 4(A), FIG. 4(B), and FIG. 4(C) present performance of multi-sample dropout using the CIFAR-100 dataset, in accordance with one embodiment of the present invention. FIG. 5(A), FIG. 5(B), and FIG. 5(C) present performance of multi-sample dropout using the ImageNet dataset, in accordance with one embodiment of the present invention.

FIG. 3(A), FIG. 3(B), FIG. 3(C), FIG. 4(A), FIG. 4(B), and FIG. 4(C) show results of trained with the original dropout, with multi-sample dropout, and without dropout. In FIG. 3(A), FIG. 3(B), FIG. 3(C), FIG. 4(A), FIG. 4(B), and FIG. 4(C), the results of trained with the original dropout (or without this invention and using dropout) are presented by dash-dotted lines, the results of trained with the multi-sample dropout (or with this invention) are presented by solid lines, and the results of without dropout (or without this invention and no dropout) are presented by dashed lines.

FIG. 5(A), FIG. 5(B), and FIG. 5(C) show results of trained with the original dropout and trained with multi-sample dropout. In FIG. 5(A), FIG. 5(B), and FIG. 5(C), the results of trained with the original dropout (or without this invention and using dropout) are presented by dotted lines, while the results of trained with the multi-sample dropout (or with this invention) are presented by solid line.

FIG. 3(A), FIG. 4(A), and FIG. 5(A) present experimental results of final training losses versus epochs. FIG. 3(B), FIG. 4(B), and FIG. 5(B) present experimental results of training error rates versus epochs. FIG. 3(B), FIG. 4(B), and FIG. 5(B) present experimental results of validation error rates versus epochs.

The figure shows that multi-sample dropout made faster progress than the original dropout for all datasets. As is common in regularization techniques, dropout achieved better generalization (i.e., lower validation error rates) compared with the cases without dropout at the expense of slower training. Multi-sample dropout alleviated this slowdown while still achieving better generalization.

After training, the networks trained with multi-sample dropout were observed to have reduced losses and error rates for all datasets compared with those of the original dropout. Interestingly, multi-sample dropout achieved even lower error rates and training losses than without dropout for some datasets. The original dropout increased the training losses and error rates by avoiding overfitting for all datasets compared with the cases without dropout.

Figure 6A:
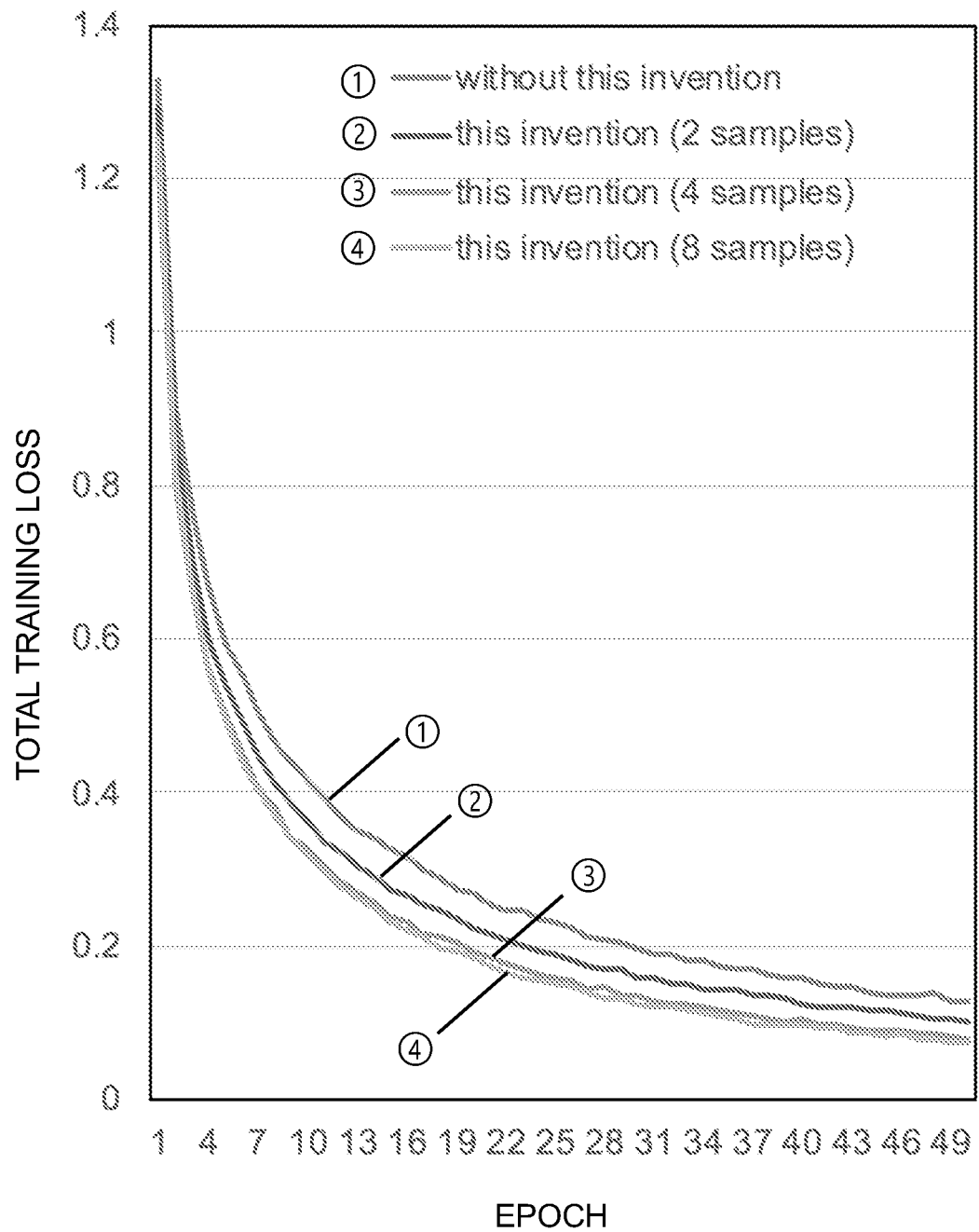
FIG. 6(A) and FIG. 6(B) present performance of multi-sample dropout with different numbers of dropout samples, in accordance with one embodiment of the present invention.
Figure 6B:
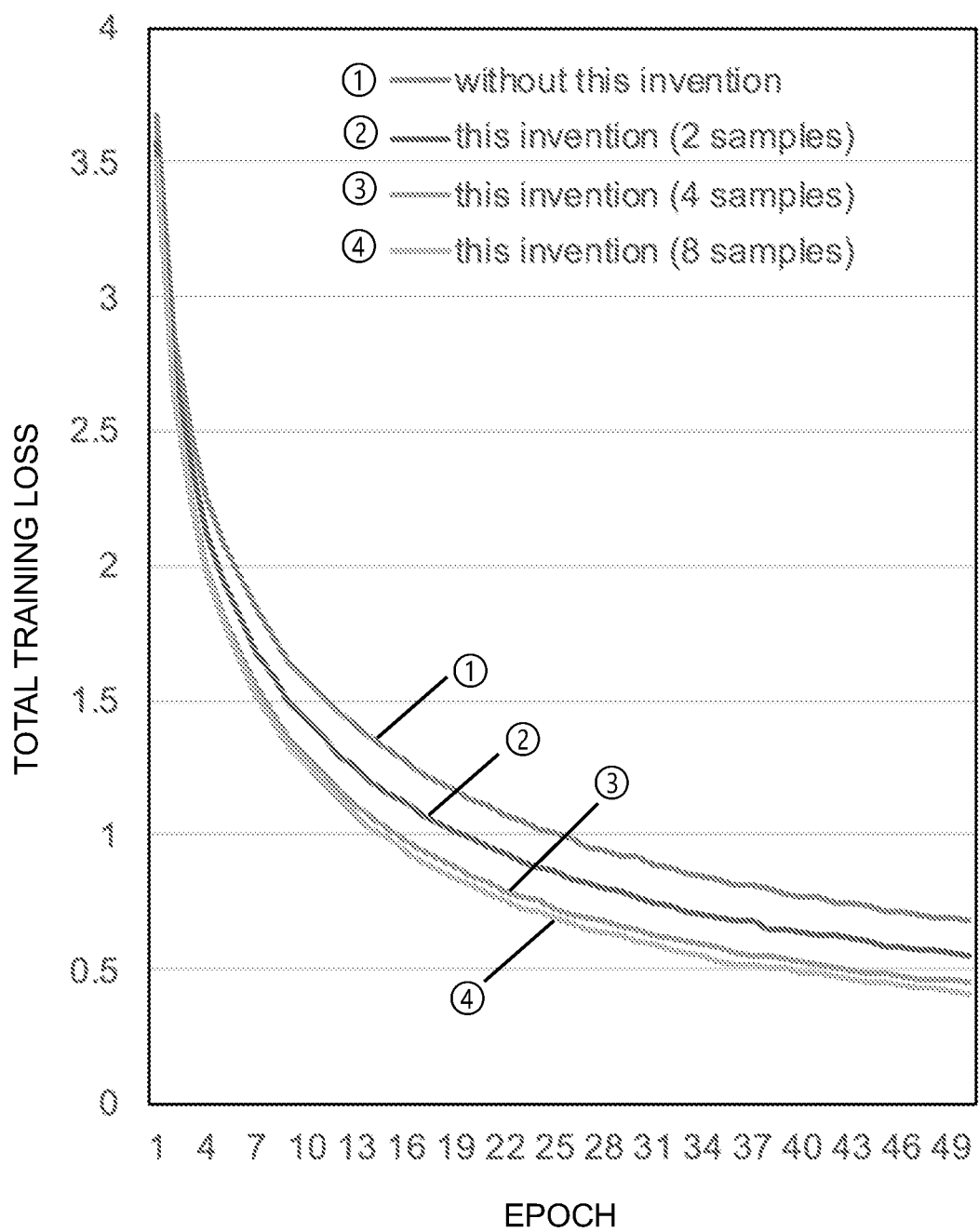

FIG. 6(A) and FIG. 6(B) present performance of multi-sample dropout with different numbers of dropout samples, in accordance with one embodiment of the present invention. FIG. 6(A) compares the total training losses versus the number of training epochs for different numbers of multiple dropout samples for CIFAR-10, while FIG. 6(B) compares the total training losses versus the number of training epochs for different numbers of dropout samples for CIFAR-100.

In each of FIG. 6(A) and FIG. 6(B), the result of trained the results of without dropout (or without this invention and no dropout) is presented by a line labeled with ①, the result of trained the results of with the invention and the 2-sample dropout is presented by a line labeled with ②, the result of trained the results of with the invention and the 4-sample dropout is presented by a line labeled with ③, the result of trained the results of with the invention and the 8-sample dropout is presented by a line labeled with ④.

The experimental results presented in FIG. 6(A) and FIG. 6(B) show that using a larger number of dropout samples accelerated the progress of the training. FIG. 6(A) and FIG. 6(B) show a clear relationship between the number of dropout samples and the speedup in training loss. Consideration of the increased execution time per iteration along with the reduced number of iterations revealed that the technique of multi-sample dropout achieves the largest speed up in training time when a moderate number of dropout samples (such as 8) is used.

Figure 7:
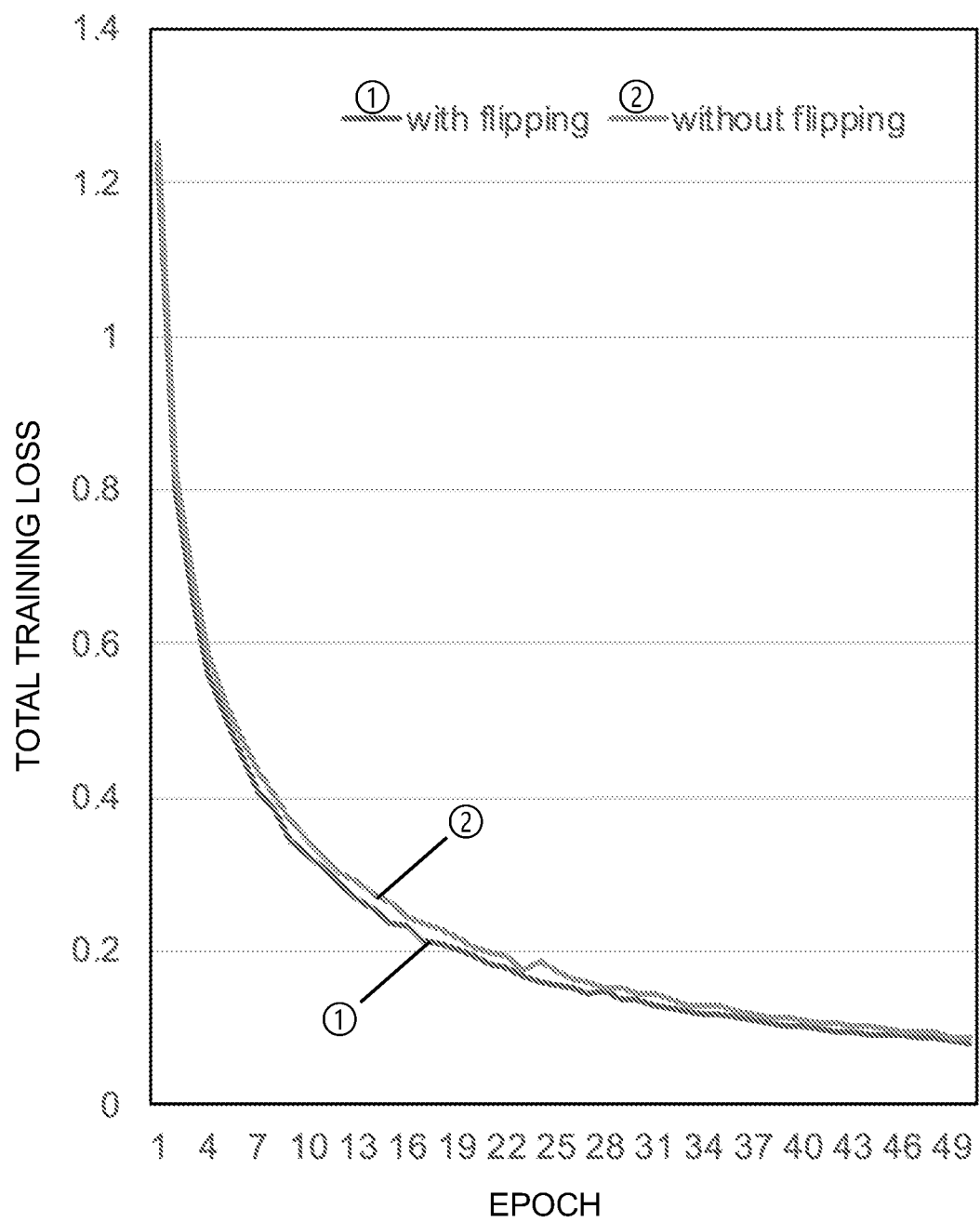
FIG. 7 presents effects of additional diversity on performance of multi-sample dropout, in accordance with one embodiment of the present invention.

FIG. 7 presents effects of additional diversity on performance of multi-sample dropout, in accordance with one embodiment of the present invention. FIG. 7 shows results of trained with flipping and without flipping in the multi-sample dropout using the CIFAR-10 dataset. The figure compares the total training losses versus the number of training epochs for two cases (with flipping and without flipping). The result of trained with flipping in the multi-sample dropout is presented by a line labeled with ①, while the result of trained without flipping in the multi-sample dropout is presented by a line labeled with ②. The results in FIG. 7 show that the multi-sample technique can work with not only dropout but also with other sources of divergence among samples.

The technique of multi-sample dropout for faster deep neural network training is implemented on a computer device or server. The computer device or severer is described in more detail in later paragraphs with reference to FIG. 8. In some embodiments, the technique of multi-sample dropout may be implemented on a virtual machine or another virtualization implementation being run on a computer device. In other embodiments, the technique of multi-sample dropout may be implemented in a cloud computing environment. The cloud computing environment is described in later paragraphs with reference to FIG. 9 and FIG. 10.

Figure 8:
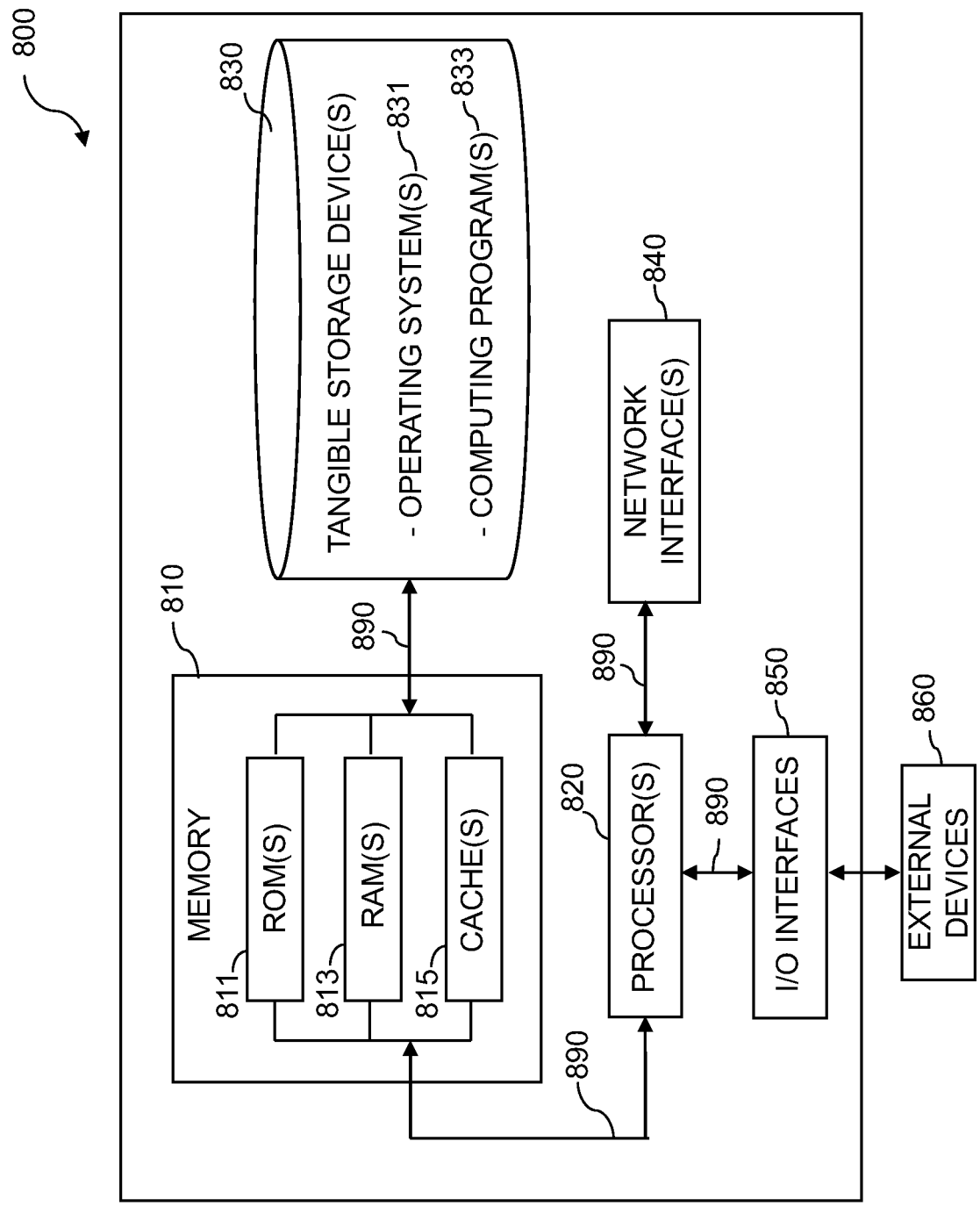
FIG. 8 is a diagram illustrating components of a computer or server, in accordance with one embodiment of the present invention.

FIG. 8 is a diagram illustrating components of computer or server 800, in accordance with one embodiment of the present invention. It should be appreciated that FIG. 8 provides only an illustration of one implementation and does not imply any limitations with regard to the environment in which different embodiments may be implemented.

Referring to FIG. 8, computer or server 800 includes processor(s) 820, memory 810, and tangible storage device(s) 830. In FIG. 8, communications among the above-mentioned components of computer or server 800 are denoted by numeral 890. Memory 810 includes ROM(s) (Read Only Memory) 811, RAM(s) (Random Access Memory) 813, and cache(s) 815. One or more operating systems 831 and one or more computer programs 833 reside on one or more computer readable tangible storage device(s) 830.

computer or server 800 further includes I/O interface(s) 850. I/O interface(s) 850 allows for input and output of data with external device(s) 860 that may be connected to computer or server 800. Computer or server 800 further includes network interface(s) 840 for communications between computer or server 800 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
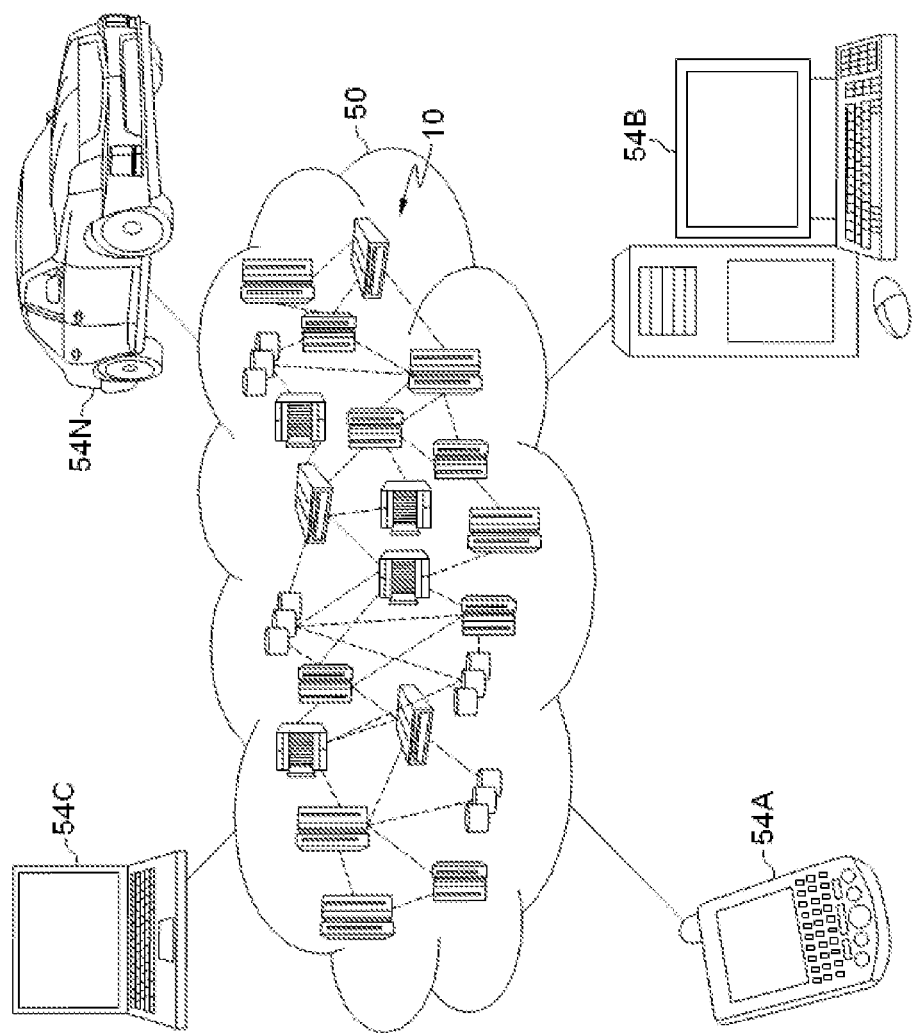
FIG. 9 depicts a cloud computing environment, in accordance with one embodiment of the present invention.

Referring now to FIG. 9, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 10:
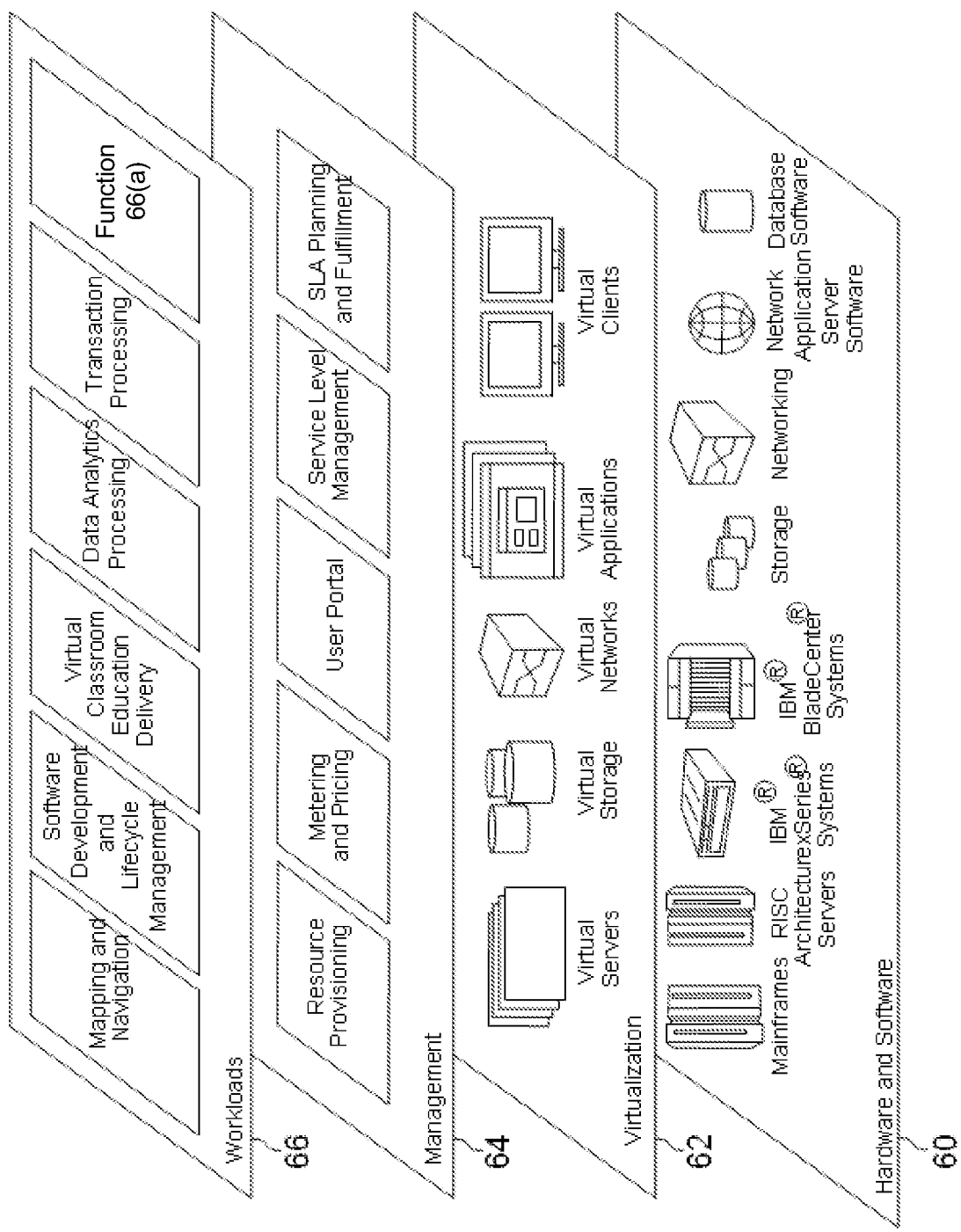
FIG. 10 depicts abstraction model layers in a cloud computing environment, in accordance with one embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality multi-sample dropout for faster deep neural network training in a cloud computing environment.

What is claimed is:

1. A computer-implemented method for multi-sample dropout in deep neural network training, the method comprising:

creating, starting from a dropout layer and ending at a loss function layer, multiple dropout samples in a mini-batch;

applying, at the dropout layer, multiple random masks for respective ones of the multiple dropout samples;

applying, at a fully connected layer, a shared parameter for all of the multiple dropout samples;

calculating, after the loss function layer, a final loss value, by averaging loss values of the respective ones of the multiple dropout samples; and wherein, at a pooling layer, horizontal flipping is applied in a pooling layer for a half of the multiple dropout samples.

2. The computer-implemented method of claim 1, wherein the shared parameter is a connection weight.

3. The computer-implemented method of claim 1, wherein different random masks are applied to the respective ones of the multiple dropout samples such that different subsets of neurons are discarded from the respective ones of the multiple dropout samples.

4. The computer-implemented method of claim 1, wherein a same loss function is used for calculating the loss values of the respective ones of the multiple dropout samples.

5. The computer-implemented method of claim 1, wherein, at the pooling layer, zero padding is applied on right sides for a half of the multiple dropout samples and zero padding is applied on left sides for another half of the multiple dropout samples.

6. A computer program product for multi-sample dropout in deep neural network training, the computer program product comprising one or more computer-readable tangible storage devices and program instructions stored on at least one of the one or more computer-readable tangible storage devices, the program instructions executable to:

create, starting from a dropout layer and ending at a loss function layer, multiple dropout samples in a mini-batch;

apply, at the dropout layer, multiple random masks for respective ones of the multiple dropout samples;

apply, at a fully connected layer, a shared parameter for all of the multiple dropout samples;

calculate, after the loss function layer, a final loss value, by averaging loss values of the respective ones of the multiple dropout samples; and wherein, at a pooling layer, horizontal flipping is applied in a pooling layer for a half of the multiple dropout samples.

7. The computer program product of claim 6, wherein the shared parameter is a connection weight.

8. The computer program product of claim 6, wherein different random masks are applied to the respective ones of the multiple dropout samples such that different subsets of neurons are discarded from the respective ones of the multiple dropout samples.

9. The computer program product of claim 6, a same loss function is used for calculating the loss values of the respective ones of the multiple dropout samples.

10. The computer program product of claim 6, wherein, at the pooling layer, zero padding is applied on right sides for a half of the multiple dropout samples and zero padding is applied on left sides for another half of the multiple dropout samples.

11. A computer system for multi-sample dropout in deep neural network training, the computer system comprising:

one or more processors, one or more computer readable tangible storage devices, and program instructions stored on at least one of the one or more computer readable tangible storage devices for execution by at least one of the one or more processors, the program instructions executable to:

create, starting from a dropout layer and ending at a loss function layer, multiple dropout samples in a mini-batch;

apply, at the dropout layer, multiple random masks for respective ones of the multiple dropout samples;

apply, at a fully connected layer, a shared parameter for all of the multiple dropout samples;

calculate, after the loss function layer, a final loss value, by averaging loss values of the respective ones of the multiple dropout samples; and wherein, at a pooling layer, horizontal flipping is applied in a pooling layer for a half of the multiple dropout samples.

12. The computer system of claim 11, wherein the shared parameter is a connection weight.

13. The computer system of claim 11, wherein different random masks are applied to the respective ones of the multiple dropout samples such that different subsets of neurons are discarded from the respective ones of the multiple dropout samples.

14. The computer system of claim 11, a same loss function is used for calculating the loss values of the respective ones of the multiple dropout samples.

15. The computer system of claim 11, wherein, at the pooling layer, zero padding is applied on right sides for a half of the multiple dropout samples and zero padding is applied on left sides for another half of the multiple dropout samples.

\* \* \* \* \*